United States Patent
Eneroth et al.

(12) 
(10) Patent No.: US 6,341,131 B1
(45) Date of Patent: Jan. 22, 2002

(54) MINI CELLS WITH VARIABLE PAYLOAD SIZE

(75) Inventors: Lars Göran Vilhelm Eneroth, Tyresö; Karl Anders Näsman, Solna; Lars-Göran Petersen, Tuma, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/789,534

(22) Filed: Jan. 27, 1997

(30) Foreign Application Priority Data

Jan. 25, 1996 (SE) .............................................. 9600279

(51) Int. Cl.⁷ ............................................. H04L 12/28
(52) U.S. Cl. ......................... 370/395; 370/328; 370/465
(58) Field of Search ................................. 370/395, 328, 370/465, 470, 471, 472, 473, 474, 522, 352, 353, 469, 337, 335

(56) References Cited

U.S. PATENT DOCUMENTS

| | | | | |
|---|---|---|---|---|
| 4,999,835 A | * | 3/1991 | Lagoutte | 370/389 |
| 5,020,055 A | * | 5/1991 | May, Jr. | 370/474 |
| 5,323,395 A | | 6/1994 | Henrion | 370/471 |
| 5,333,135 A | * | 7/1994 | Wenderof | 370/394 |
| 5,481,544 A | * | 1/1996 | Baldwin | 370/392 |
| 5,487,064 A | * | 1/1996 | Galand | 370/392 |
| 5,570,362 A | * | 10/1996 | Nishimura | 370/395 |
| 5,583,859 A | * | 12/1996 | Feldmeier | 370/471 |
| 5,606,552 A | * | 2/1997 | Baldwin | 370/474 |
| 5,802,050 A | * | 9/1998 | Peterson | 370/394 |
| 5,805,588 A | * | 9/1998 | Petersen | 370/356 |
| 5,822,321 A | * | 10/1998 | Petersen et al. | 370/474 |

FOREIGN PATENT DOCUMENTS

| | | |
|---|---|---|
| DE | 43 26 377 A1 | 2/1995 |
| JP | A 58-19061 | 2/1983 |
| JP | A 58-181392 | 10/1983 |
| SE | 503 317 C2 | 12/1995 |

OTHER PUBLICATIONS

G. Eneroth et al., "Minicell Protocol (AALm) for Low Bit Rate Applications" Atm–Forum 96/0166, Feb. 1996.
T. Ishihara, "Proposal of Short Cell Format for Low Bit Rate Voice", Atm–Forum/95–1478, Dec. 1995.
M. J. McTiffin, et al., "Mobile Access to an ATM Network Using a CDMA Air Interference", 8272 IEEE Journal on Selected Areas in Communications, 12(1994) Jun., No. 5, pp. 900–908, New York, US.
Maximilian A. Ott, et al., "Prototype ATM LAN System Multimedia on Demand Applications", 298 NEC Research & Development, 35(1994) Oct., No. 4, pp. 366–373, Tokyo, JP.
"B–ISDN ATM Adaptation Layer (AAL) Type 5 Specification", ITU–T Recommendation I.363.5, 1996.
"An AAL for Transporting Short Multiplexed Packets (SMAAL)", T1S1.5/95–001 Revision 1, Dec. 1995.

* cited by examiner

*Primary Examiner*—Douglas Olms
*Assistant Examiner*—Ricardo M. Pizarro
(74) *Attorney, Agent, or Firm*—Burns, Doane, Swecker & Mathis, L.L.P.

(57) ABSTRACT

A method of indicating the length of a mini cells in a mobile telephony network. Non linear coding of a short fixed length field in the header of the mini cell is described. Either an extension bit method or an extension code method is used to extend the length field so as to increase the number of length values available for coding of the mini cell sizes. The length of a mini cell is indicated in the individual mini cell or is indicated indirectly using a CID/length mapping table. Mini cell sizes are changed during a connection and methods are described for doing this. Cell header reading devices for extracting user information of individual mini cells are described. A mobile telephone network using the cell header reading devices is described.

34 Claims, 11 Drawing Sheets

Fig.1

PRIOR ART

Fig.2

PRIOR ART

Fig.3

PRIOR ART

| CODE | SEIZE (OCTETS) |
|---|---|
| 0 0 0 | 4 |
| 0 0 1 | 8 |
| 0 1 0 | 16 |
| 0 1 1 | 20 |
| 1 0 0 | 35 |
| 1 0 1 | 43 |
| 1 1 0 | 56 |
| 1 1 1 | 60 |

| CODE | SEIZE (OCTETS) |
|---|---|
| 0 0 0 0 0 0 | 2 |
| 0 0 0 0 0 1 | 4 |
| 0 0 0 0 1 0 | 5 |

| | |
|---|---|
| 1 1 1 1 0 0 | 100 |
| 1 1 1 1 0 1 | 125 |
| 1 1 1 1 1 0 | 150 |
| 1 1 1 1 1 1 | 200 |

| LEQ | LEN |
|---|---|
| 0 0 | 0 0 0 0 |
| 0 0 | 0 0 0 1 |
| 0 0 | 0 0 1 0 |
| ⋮ | ⋮ |
| 0 0 | 1 1 1 1 |
| 0 1 | 0 0 0 0 |
| 0 1 | 0 0 0 1 |
|  | 0 0 1 0 |
| ⋮ | ⋮ |
| 0 1 | 1 1 1 1 |
| 1 0 | 0 0 0 0 |
|  | 0 0 0 1 |
|  | 0 0 1 0 |
| ⋮ | ⋮ |
| 1 0 | 1 1 1 1 |

MINI CELLS WITH VARIABLE PAYLOAD SIZE

TECHNICAL FIELD OF THE INVENTION

This invention relates to telecommunication networks in general and to the transport network of a mobile telephone network. ATM cells are used for transmission of data. The payload of an ATM cell comprises mini cells.

DESCRIPTION OF RELATED ART

EP-A1 528 085 describes the use on non-standard short cells, called mini cells, for transmission of information. Mini cells are used in order to reduce the time it takes to fill an empty mini cell with information, the so called packetizing time. Reduced packetizing time will eliminate the need of echo cancellers for a connection which extends between two STM switches via an intermediate ATM switch. Standard ATM cells, comprising 53 octets, are used for connections which extends between a STM switch and ATM switch via an intermediate ATM switch.

PCT/SE95/00575 describes an ATM switch for emulating circuit oriented traffic using short cells in order to reduce the delay through the ATM switch. Small cells are also used in order to save bandwidth on a physical route within the switch. A switch internal interface defines the small cells. Within an ATM switch mini cells of different sizes are used simultaneously. The size of a mini cell is selected from a number of predefined cell sizes. In the payload of a cell, and in particular in the payload of an ATM cell, one or more mini cells are transported within the ATM switch. A central controller selects the cell size to be used for an individual connection. The cell size is changed at a mapping unit resident in the ATM switch. In the header of a short cell a field of fixed length, 4 bits, is used to indicate the size of the cell. The cell header also comprises a cell format indicator bit. If the cell format indicator is 0 the payload of the cell comprises 3 octets (time slots) and if the cell format indicator equals 1 this indicates that the header is extended by on octet. The extended header comprises a field of fixed length, 4 bits, which is used to indicate the size of the payload of the cell. In this patent it is also indicated that the size of the cell may be indirectly given by the cell's physical route identifier PRI and the virtual path VP to which it is assigned within the switch. No method for changing the size of a cell of an ongoing connection is disclosed in the patent.

DE 43 26 377 relates to frame relay and describes a method by which it is possible to distinguish between user data frames on the one hand and operation and maintenance frames on the other hand by using a particular bit in a particular octet of the address field of a frame. It the particular bit is 0 the frame is an ordinary user data frame and if it is set to 1 the frame is an operation and maintenance cell. This is possible since, according to CCITT recommendation Q.922, this particular bit is not used for any purpose of carrying information.

Japanese patent 58-181392 relates to a pulse modulated remote controlling system. Transmission time of a control instruction is decreased by using an extension code in predefined bits. The predefined bits are, according to the standardized transmission format, not used for any purpose of carrying information.

In ANSI T1S1.5/95-001 Revision 1, "An AAL for transporting Short Multiplexed Packets (SMAAL)", December 95, the ATM adaptation layer AAL encapsulates and transports short user packages inside an ATM cell stream. A field of fixed length is used to indicate the length of the mini cell.

The main shortcoming adhering the use of a field of fixed length to indicate the size of the mini cell is poor transmission efficiency, in particular when the size of the user data of the cell is significantly small. For example, with a payload size of 17 octets the size of the field of fixed length would be 7 bits which translates into about 6% of the band width.

Other shortcomings related to the use of a fixed length field in the header of a mini cell relates to transmission delay. The transmission delay depends on inefficient bandwidth utilization when the mini cells are subjected to statistical multiplexing.

SUMMARY

A main object of the invention is to save band width on a link in a mobile telecommunication system.

Another object of the invention is to shorten the fixed length field and to use the bits gained in doing so either to save bandwidth or to extend the circuit identifier field, referred to as the CID field, in the header of a mini cell.

The main object of the present invention is to reduce and even eliminate the number of bits used in the header of a mini cell to indicate the size of the cell.

Another object of the invention is to indicate the length of a mini cell by using a short fixed length field using non-linear coding in order to provide a wide range of many different cell sizes.

Still another object of the invention is to provide an extension bit by which the fixed length field is extended. The extension bit is provided in the short fixed length field of the header of a mini cell.

Still another object of the invention is to indicate the length of a mini cell using a an extension code provided in the short fixed length field of the header of the mini cell.

Still another object of the invention is to indicate the length of a mini cell using a short fixed length field in combination with a length extension qualifier field.

Another object of the invention is to use length extension qualifier field as an indicator of an extended header format of the mini cell.

Still another object of the invention is to indicate the length of a mini cell indirectly by associating the circuit identifier CID of an individual connection with a cell size which is selected from a group of predefined cell sizes.

Still another object of the invention is to indicate the cell size of a mini cell indirectly by associating, on a system wide basis, a circuit identifier CID with a cell size. Each cell size is associated with a respective circuit identifier CID which in turn is global in the transport network.

In a mobile telephone system that uses ATM cells in the transport network reduced bandwidth or enhanced use of the available bandwidth will make it possible to add more channels into the system.

A large number of connections, which require a larger CID field, will increase the bandwidth gain if statistical multiplexing is used.

BRIEF DESCRIPTION OF THE DRAWINGS

The invention will be better understood and other characteristics thereof will emerge from the following description made with reference to the appended Figures wherein.

DETAILED DESCRIPTION OF EMBODIMENTS

Figure 1:
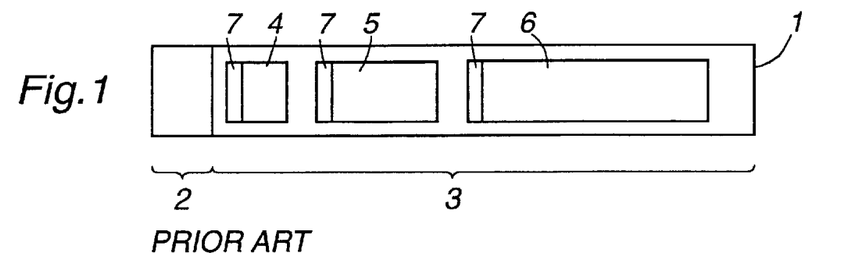
FIG. 1 shows the format of an ATM cell transporting mini cells therein.

In FIG. 1 an ATM cell 1 is shown which comprises a header 2 and a payload 3. Conventionally the payload comprises user data relating to an individual connection. In the aforesaid PCT/SE95/00575 patent document an ATM cell is disclosed which in its payload carries one or more mini cells. In the example shown in FIG. 1 three mini cells 4, 5 and 6 of different sizes are shown. The ATM header 2 comprises 5 octets (1 octet=8 bits=1 byte) and its payload 3 comprises 48 octets. Each mini cell 4, 5, 6 comprises a header 7 and user data.

Figure 2:
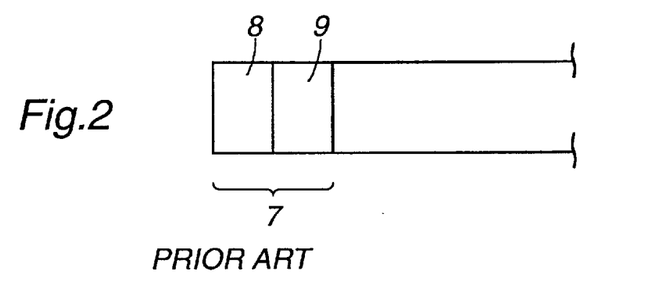
FIG. 2 shows the header of a mini cell transported in the ATM cell in FIG. 1.

In FIG. 2 an example of a mini cell header 7 is shown to comprise 2 octets 8, 9. Other mini cell header sizes are also conceivable depending on the ATM system design. A mini cell header size of 3 octets or more are also conceivable. The mini cell header 7 comprises a circuit identifier CID, which identifies the established connection/circuit, a payload type selector PTS which identifies different payload types such as user data, control data, maintenance data, a length indicator LEN, and a header integrity check field/bit HIC, which supervises the header integrity. The length indicator LEN defines the size of the payload of the individual mini cell.

There is a need for distinguishing between different types of mini cells. The following is required to indicate with the PTS field:

User information of fixed length: The length indicator LEN is not necessary in the header and the user information length is instead configured into the system and into the service. For "GSM full rate", the user information length is 35 octets, for PDC full rate it is 20 octets and for "D-AMPS full rate" it is 23 octets.

User information of different sizes, i.e. user information with variable length: This is the preferred embodiment and will be described below. To use the PTS field in order to indicate user information with variable length is a future proof solution.

User information of different sizes of extended lengths. OAM information per circuit/connection.

Synchronization information: The use of the PTS field for this purpose is optional.

Figure 3:
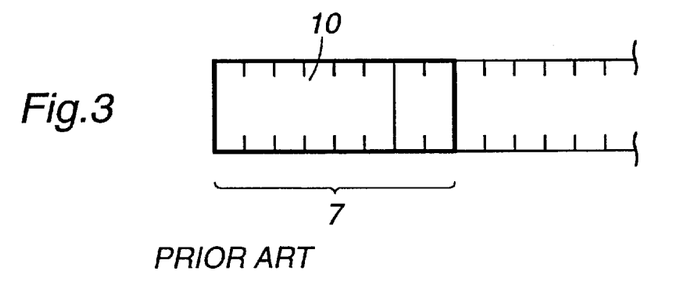
FIG. 3 shows an octet of the cell header of FIG. 2, said octet comprising a fixed size length field for indicating the length of the mini cell.

In FIG. 3 the cell header 7 is shown to comprise a fixed size length field 10, referred to as LEN field, which is used to indicate the size of the user data of the mini cell to which the header belongs. The size of the mini cell is indicated in this field 10 using linear coding. Linear coding means that the code corresponds to the actual size of the mini cell. For example, if the cell length is 5 octets a binary 5 (000101) is written into the LEN field. For short mini cell sizes the fixed length field 10 will occupy much band width but all of the occupied band width is not used for transmission of useful information as exemplified by the leading zeros in the two examples given. It should be noted that the LEN field 10 is carried by each mini cell of an individual connection. A further drawback with this fixed size LEN field 10 is that the range of cell sizes which can be expressed with linear coding is restricted. With a fixed size LEN field 10 comprising 6 bits cell sizes from 1 to 64 octets can be indicated. Should larger cell sizes be used for an individual connection, then the length of the fixed size length field 10 must be enlarged which in turn leads to even more waste of band width.

Figure 4:
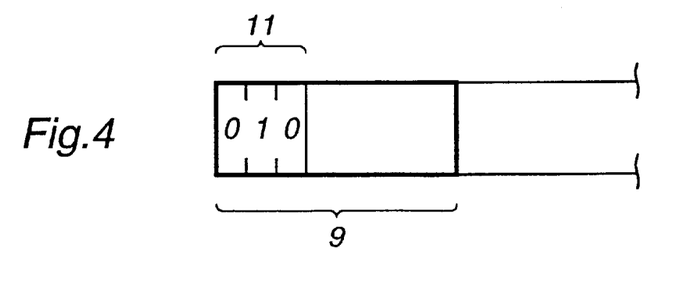
FIG. 4 shows an octet in the header of a mini cell, said octet comprising a fixed size length field linearly coded in accordance with the invention.

In FIG. 4 a fixed size length field 11 in accordance with the invention is shown. Non-linear coding is used to indicate a wide range of different cell sizes. In the example given 3 bits are used in an octet, for example octet 9, of a mini cell's header. The rest of the bits of the same octet are free and can be used for any of the above listed purposes. This contributes to reduce the overall size of the header which in its turn increases the efficiency with which the band width is used.

In a mobile telephony system mini cells are generated by voice coders. Today the current IS 95 voice coders uses 2, 5, 10 or 22 octets. Using the fixed size length field 10 in accordance with said ANSI document 7 bits would be required in the header of the mini cell in order to indicate a cell size of 22 octets. With the non-linear coding in accordance with FIG. 4 the fixed size length field 11 is 3 bits. This gives a band width saving of 10% for an IS 95 voice coder that operates at 2 kbps (5 octets per 20 ms).

Figure 5:
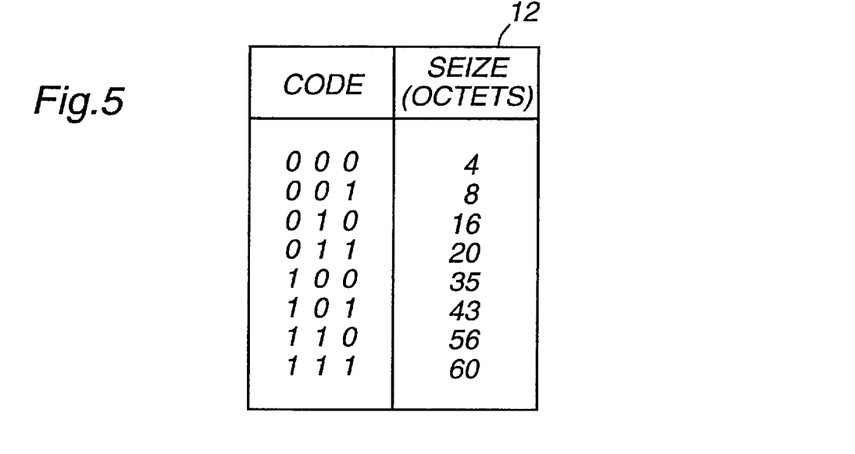
FIG. 5 is a mapping table.

In FIG. 5 a mapping table 12 is shown which is to be used together with a fixed size length field 11 in accordance with the invention. As appears from the table the code values do not correspond to the mini cells sizes but instead predefined cell sizes are allocated to a respective code value only three code bits are used. Examples of mini cells sizes are given in the size column of the mapping list. The sizes vary from 4 to 60 octets. Of course the range can be increased, but the maximum number of sizes is given by the number of code bits used.

To expand the number of sizes that can be used together with the non-linear coding it is possible to extend the fixed LEN field 11 on demand. Two methods will be described. Either an extension bit in the fixed size LEN field 11 is used as a qualifier for extension of the LEN field 11 and the method is referred to as the extension bit method, or is one of the length field codes used as qualifier for extension of the LEN field 11 in which case the method is referred to as the extension code method.

Figure 6:
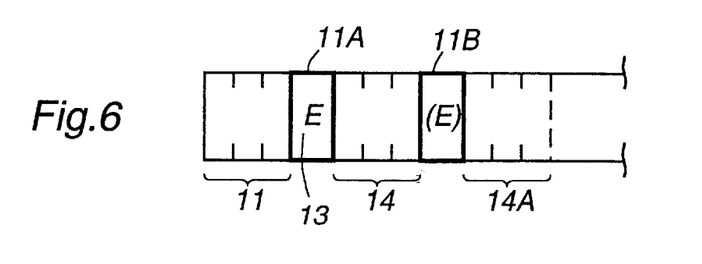
FIG. 6 shows the fixed size length field and an extended fixed size length field created by the extension bit method in accordance with the invention.

In FIG. 6 a bit 13, also labeled E, following the LEN field 11 is reserved as an extension bit 13. When the extension bit 13 is set to 1 this will indicate that the header of the mini cell comprises an extended LEN field 14 of the same size as the fixed size LEN field. When the extension bit is zero, the cell header comprises the fixed LEN field 11 only.

The extended length field 14 comprises 3 bits in the illustrated example.

Figure 7:
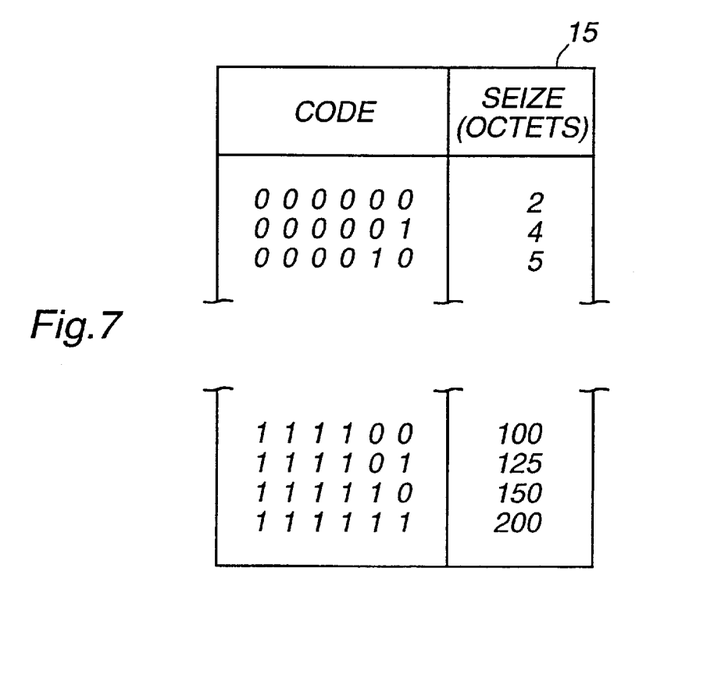
FIG. 7 is a mapping table.

When the extension bit 13 is set the number of bits available for the mapping table 12 will increase from 3 to 6 bits leaving a mapping table 15 shown in FIG. 7. Since the extension bit 13 is reserved for this purpose it cannot be used for code size mapping purposes.

A variation of the extension bit method is to append an extension bit 11B to the extended LEN field 14. The appended extension field is used to indicate if there is a further extended LEN field in the header in the mini cell or not. If the appended extension bit 11B is set to 1 this indicates that a second extended length field 14A should be added to the header, thus increasing the number of code bits in table 15 from 6 to 9. If the appended extension field comprises a bit which is set to 0 no such second field is used.

Figure 8:
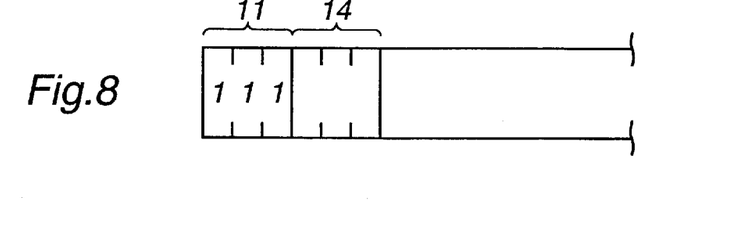
FIG. 8 shows a fixed size length field and an extended fixed size length field created with the extension code method in accordance with the invention.

In FIG. 8 the extension code method is illustrated. In accordance with this method a code in the fixed length field 11 of FIG. 4 is reserved and is used as extension code. Suppose, as an example, that binary code 111 in mapping table 12 is used as an extension code. When this code 111 is present in the fixed length field 11 it means that an extended length field 14 should be included in the header of the mini cell. Thus another 3 bits are available for size mapping. This has been illustrated in FIG. 8. This method will reduce the number of sizes in mapping table 12 with 1 and will add another seven cell sizes that can be mapped on the additional 8 code values of the extended length field 14.

From band width efficiency view the extension code method is better than the extension bit method since it requires 3 bits, while the extension bit method requires 4 bits. Looking on the value range the extension bit method is better than the extension code method since it provides 16 different cell sizes compared to 14 as provided by the extension code method.

Figure 9:
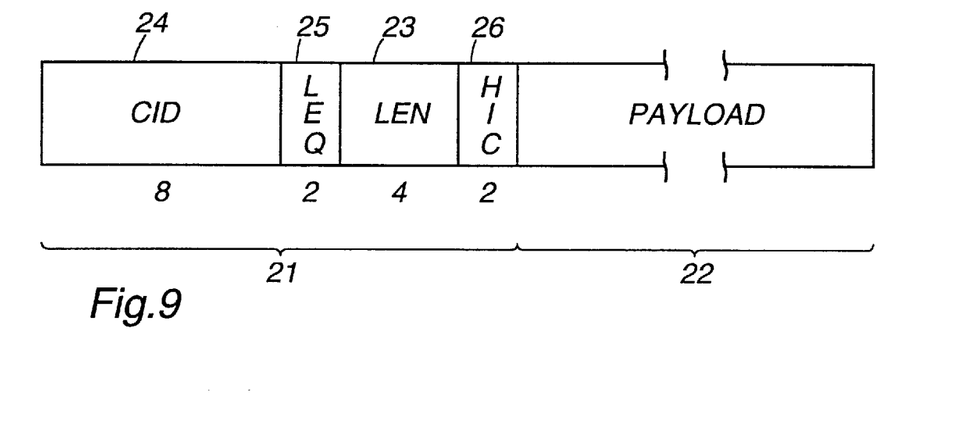
FIG. 9 shows the basic format of a mini cell the header of which is provided with a short fixed length field and a length extension qualifier field LEQ comprising different extension codes.

In FIG. 9 the extension bit method has been combined with the extension code method in a manner that allows for high efficiency use of the bits available in a cell header while at the same time a broad range of cell sizes are covered and the band width is used efficiently.

The basic format of the mini cell using this combined coding method is shown in FIG. 9. The mini cell comprises a header 21 of 2 octets and a payload part 22 which may comprise from 1 to 48 octets. The four least significant bits of the length of the mini cell is indicated in a small fixed size length field 23, LEN field, in the header. The LEN field 23 comprises 4 bits. The header also comprises a CID field 24 which occupies 8 bits and which identifies the circuit to which the mini cell belongs. Also in the header there is a length extension qualifier field 25, LEQ field, and a header integrity field 26, HIC field, both 2 bits long.

In accordance with the invention the length extension qualifier LEQ 25 is defined as a length extension for the payload and as a header extension. When LEQ takes the binary codes of 00, 01 and 10 the mini cell has the basic format shown in FIG. 9 and the code bits of LEQ constitute bits to be appended to the LEN field 23. In this case the LEQ field will thus serve as an extension of the LEN field 23.

Figure 10:
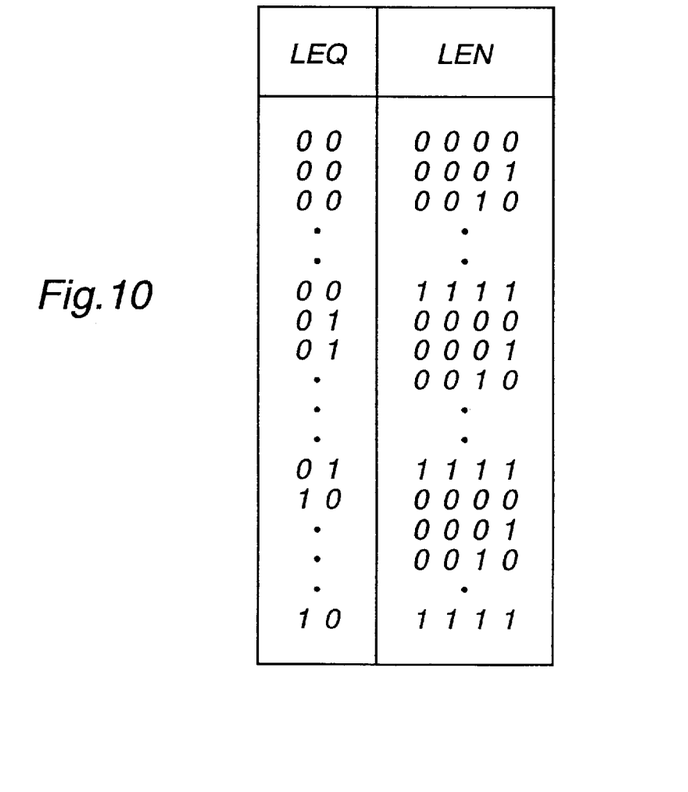
FIG. 10 is a table.

In particular, $2^4$ different values in LEN field 23 is associated to the binary 00 code existing in the LEQ field 25, $2^4$ different values in LEN field 23 is associated with the binary 01 code existing in LEQ field 25 and $2^4$ different values in LEN 23 is associated with the binary code 10 existing in LEQ field 25. This is illustrated in FIG. 10. This gives a total of 48 different length values in accordance with the following general expression:

$$[2^{length\ of\ LEQ\ in\ bits} - m] \times [2^{length\ of\ LEN\ in\ bits}]$$

where m is the number of codes used to indicate the extended format of the mini cell.

Accordingly the payload size can be chosen from forty-eight length values. In the example given the length values are coded as 1 to 48.

Figure 11:
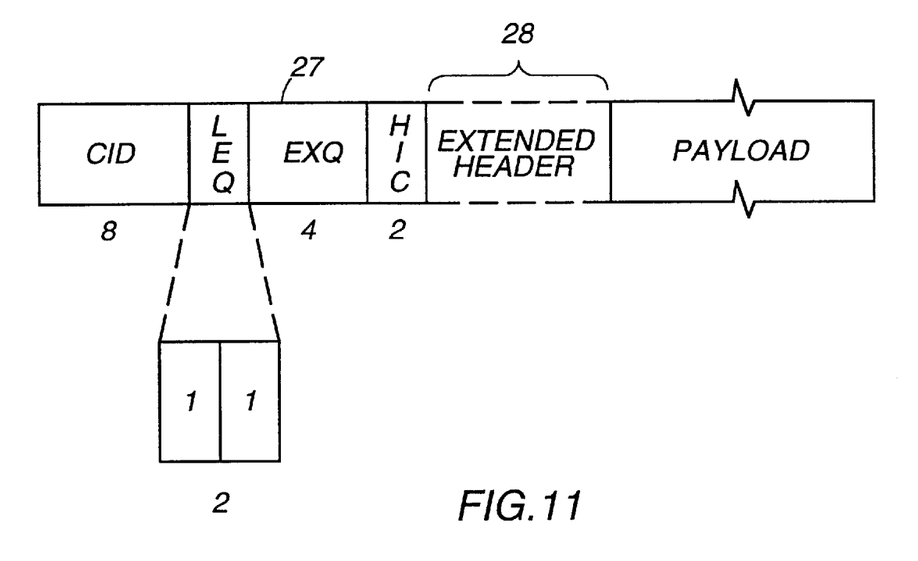
FIG. 11 shows the extended format of a mini cell.
Figure 12:
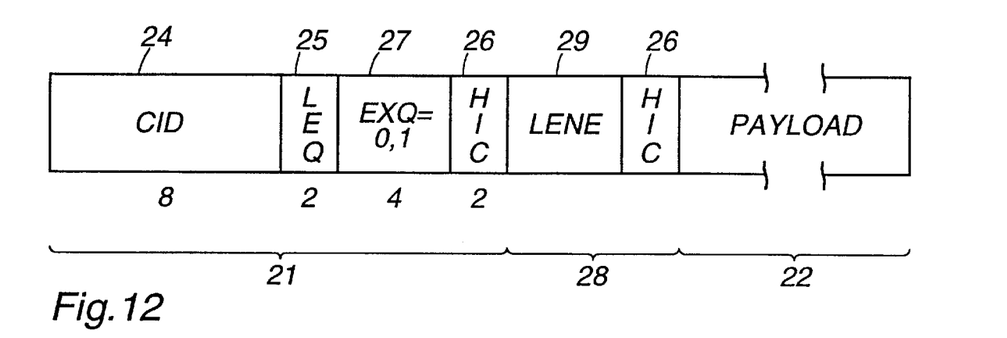
FIG. 12 shows the mini cell of FIG. 9 in its extended format when predefined extension codes are present in the length extension qualifier field.

When the LEQ field 25 takes the binary code 11 this signifies that the basic cell format should be extended. The extended format is shown in FIG. 11. The LEQ field 25 has a double meaning. The double meaning of LEQ is (i) it is used as the two most significant bits of length indication, i.e. LEQ×$2^4$+LEN as shown in FIG. 9 and (ii) it is used as indication of extended header format as shown in FIGS. 11 and 12, i.e. the LEN field 23 is interpreted as an extension qualifier field 27, EXQ field 27. The EXQ field 27 comprises 4 bits.

Figure 13:
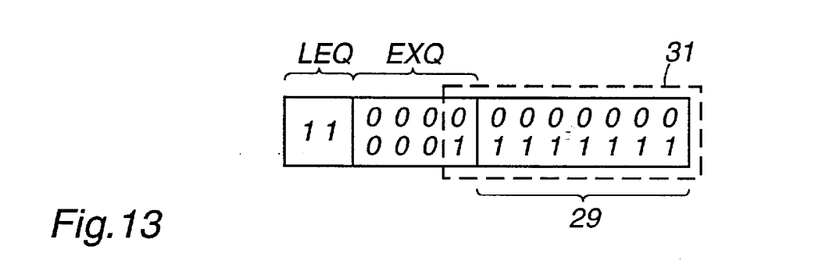
FIG. 13 is a table.

Of the four bits of the EXQ field 27 the binary values of 0000 and 0001 are reserved for use together with a further length field 29, LENE field, in the manner shown in FIGS. 12 and 13. In particular the least significant bit in EXQ field 27 should be appended to the seven bits in the further LENE field 29 in a manner shown in the dashed rectangle 31 in FIG. 13. This is similar to what shown in FIG. 10. For the EXQ binary value of 0 this will give 128 different length values and for the EXQ binary value of 1 this will give another 128 different length values.

The number of different length values that can be used with this method is given by the following general expression:

$$[2^{number\ of\ EXQ\ bits\ used}] \times [2^{number\ of\ bits\ in\ LEN\ 29}]$$

In a preferred embodiment of the invention an EXQ value of 0 is used to indicate mini cell lengths varying from 1 to 128 octets and an EXQ value of 1 is used to indicate mini cell lengths varying from 129 to 256 octets.

It should be noted that the length of the mini cell shown in FIGS. 9 and 12 is indicated by using a linear coding.

Figure 14:
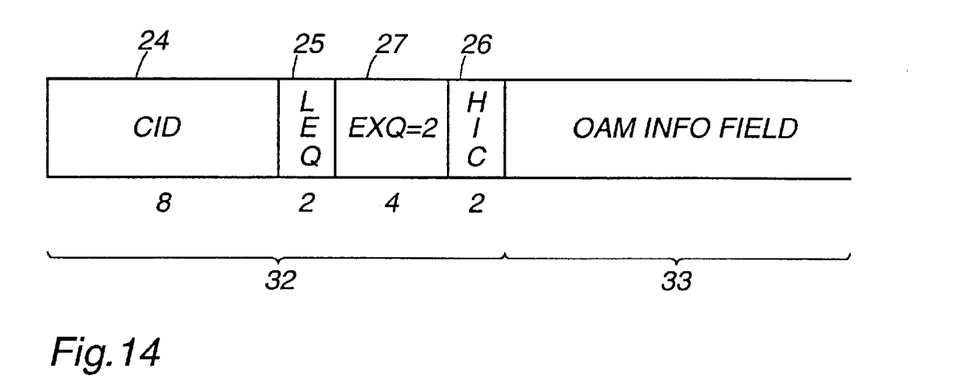
FIG. 14 shows an operation and maintenance cell.

An EXQ value of 2 (binary 0010) is used to signify that the mini cell is an operation and maintenance cell, OAM cell, that comprises a header 32, and an OAM information field 33 as shown in FIG. 14. The header 32 is similar to the header 21 in FIG. 12. In the LEQ field 25 the binary code 11 is present and in the EXQ field 27 the binary code 0010 is present.

The EXQ code 3 (binary 0011) is used to indicate a fixed length mini cell, for example for the DAMPS system standard. Other EXQ values can be used for other systems standards or services.

EXQ code values 1xxx are used as synchronization cells; wherein xxx is timing information.

In the preferred embodiment a main requirement is that the header of the mini cell at the maximum has a length of 2 octets. Given this restriction the available bits are used in an efficient way to cover all ranges of values.

In FIGS. 9, 11, 12, 14 preferred sizes are indicated under the respective fields. The indicated sizes are just examples and many other sizes of the different fields can be used. Other LEQ and EXQ codes than the indicated can be used as bits that are appended to the LEN field 23 and LENE field 29.

Figure 15:
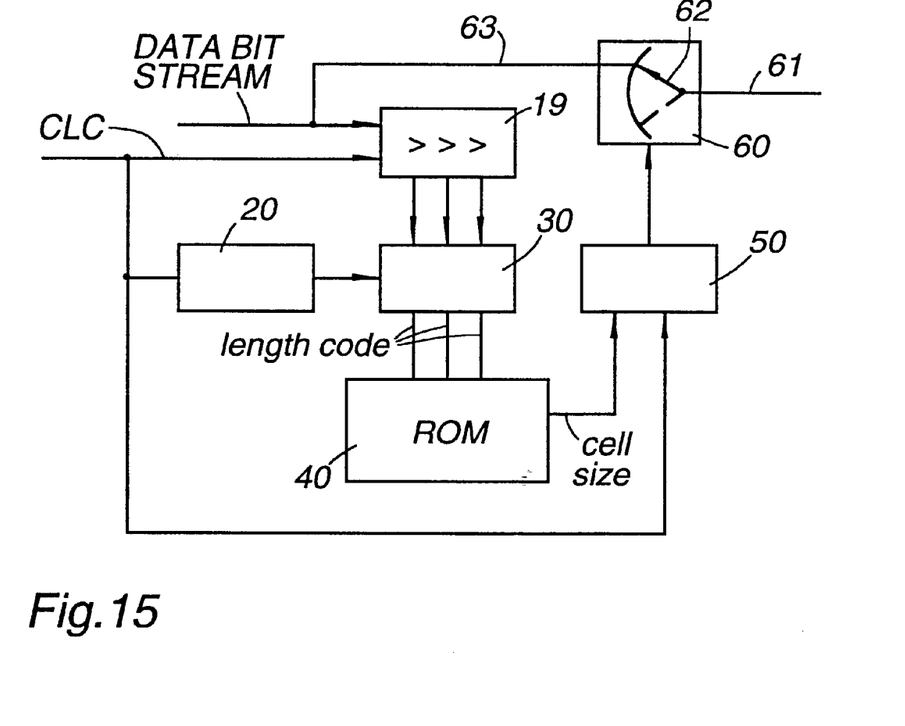
FIG. 15 is a block diagram showing a mini cell header analyzing unit used to extract, from the user data channel, the user data part of a mini cell in which the fixed size length field carries the non-linear coding in accordance with the invention.

In FIG. 15 a block schema of a cell header reading device is shown. It comprises a shift register 19, a first counter 20, a latch register 30, a ROM memory 40, a second counter 50 and a multiplexor 60. A bit stream comprising the user data of the mini cells is shifted into shift register 19 at one input thereof. A clock signal controls the frequency at which the data bits are shifted into the shift register 19. The clock signals are counted by the first counter 20 which is used to extract the fixed size length field 11 of a mini cell and write its data into the register 30. The fixed length field or rather the information therein is used as address to the ROM memory 40 which has been configured with the mapping table shown in FIG. 5. Accordingly, an individual code, in the following referred to as length code, will correspond to a specific length of the user data. From the ROM memory 40 the size of the user data (mini cell size minus the size of the header) is read and is sent to the second counter 50 which controls the multiplexor 60 such that at the output 61 thereof the user data will appear. Suppose the first counter 20 reads the binary code 011 from the user data channel. This code is used as address to the ROM memory and at this address the cell size 20 is stored. Accordingly the length of the user data should be 20 octets. Next the second counter 50 counts the following 20 octets bit by bit by counting a corresponding number of clock pulses. The multiplexor 60 is shown to have an arm 62 which is movable between the indicated two positions. Initially counter 50 sets the arm 62 to the lower position shown with dashed lines and no output data will appear at output 61. When the second counter 50 receives the cell size from the ROM memory 40 it moves arm 62 into the upper position. In the upper position arm 62 connects to a line 63 which in its turn is connected to the input user data channel. When the second counter 50 has counted 20 octets it moves arm 62 back to its initial position and the correct number of octets has now been produced at output 61.

Figure 16:
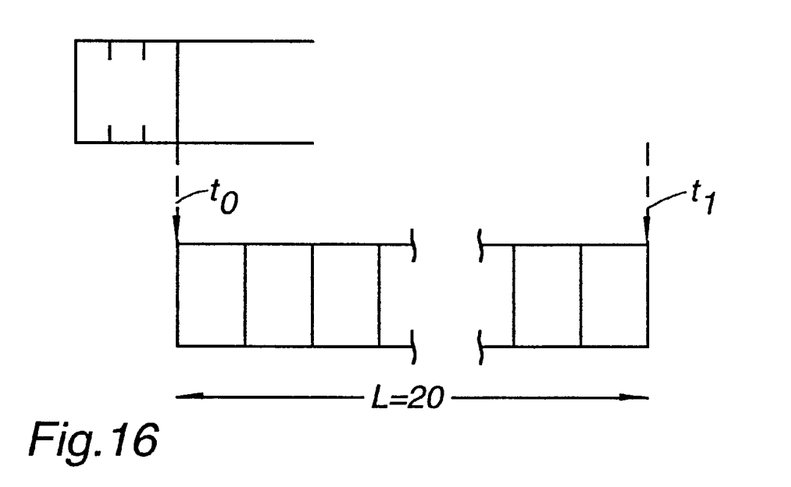
FIG. 16 shows a mini cell's header and user data as extracted from the user data channel.

In FIG. 16 the extraction of the fixed size length field 11 from the user data channel at time $t_q$ is indicated. At time $t_0$ counter 20 starts to count 20 octets bit by bit and at time $t_1$ counter 20 has counted 20 octets. Accordingly arm 62 will be in the upper position in FIG. 15 between times $t_0$ and $t_1$.

In the cell header reading device shown in FIG. 15 a predefined number of length codes and cell sizes are stored in ROM 40. In the cell header reading device shown in FIG. 17 a RAM memory 70 is used to which length codes and cell sizes are written from a control system 80. In this manner it is possible to configure different specific mini cell sizes for individual mobile telephone systems.

The mini cell sizes stored in ROM 40 are global in the sense that an individual length code, for example 101, relate to all connections which use mini cells with this length code.

It is, however possible to have a specific mini cell size for a specific connection or for a specific physical link by using the control system 80 and the RAM memory 70 as will be described in connection with FIGS. 18–27.

Figure 17:
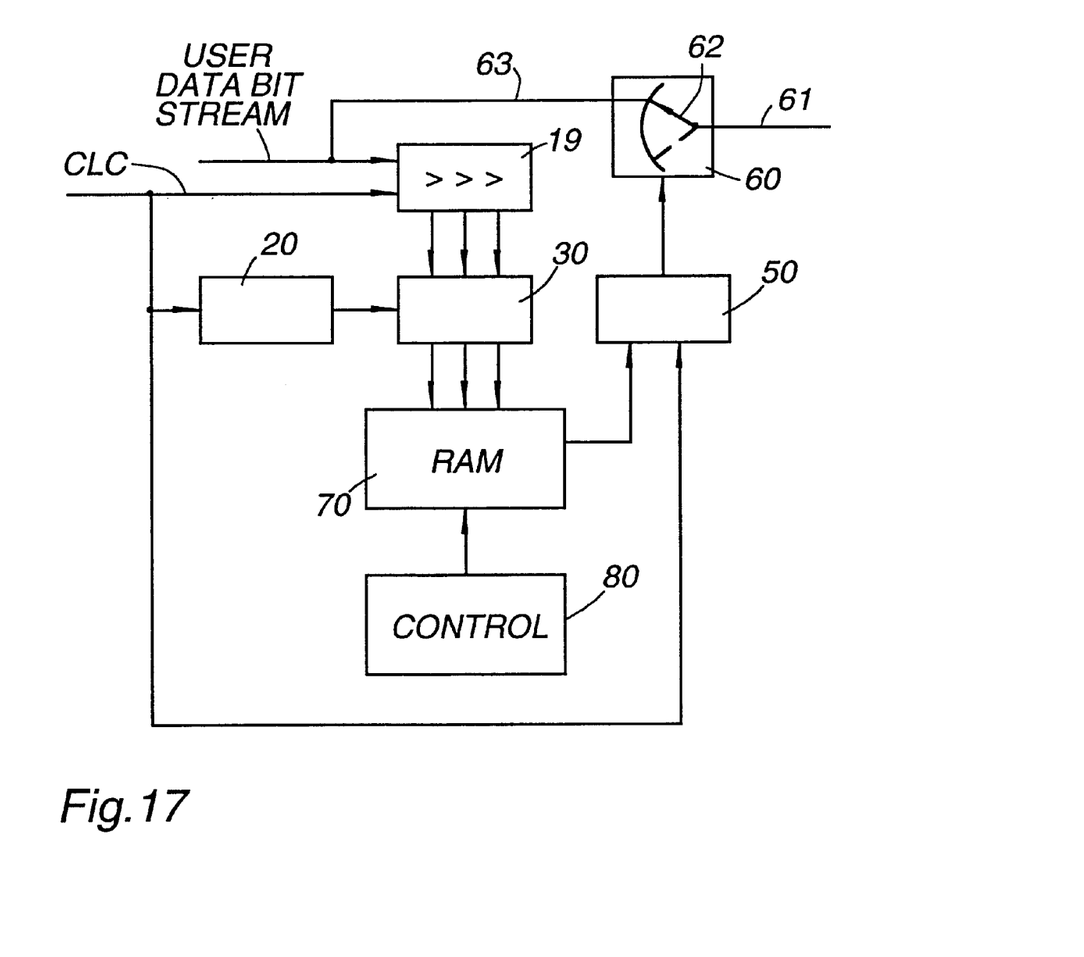
FIG. 17 is a block diagram of a mini cell header analyzing unit used to extract the user data part of a mini cell from a user data channel using the extension code method in accordance with the invention.
Figure 18:
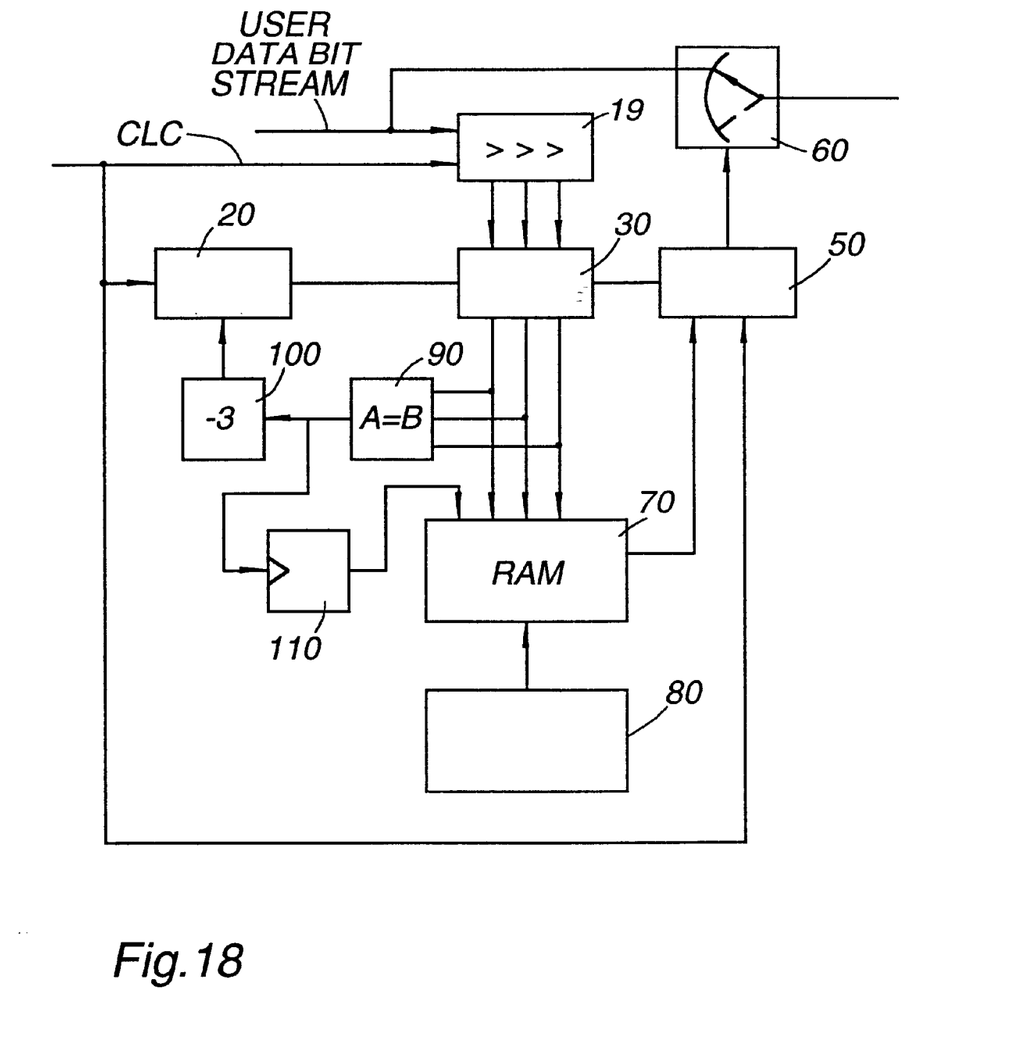
FIG. 18 is a block diagram of a modified mini cell header analyzing unit used to extract the user data part of a mini cell from a user data channel using either the extension code method or the extension bit method.

FIG. 18 is a block diagram of a cell header reading device used for implementing the extension code method. In FIG. 18 blocks with the same functions as corresponding blocks in FIGS. 15 and 17 have the same reference designations. The circuit differs from that shown in FIGS. 15 and 17 in that there is a comparator 90 which is used to detect the extension code. If there is a match, the comparator triggers a subtractor 100 which counts down the first counter 20 by 3 counts. When this has been done the extended length field, or specifically the data therein, is again written into the register 30. The various sizes associated with the extended field 14 must be added to the RAM memory 70. This implies that the number of cell sizes in the RAM memory will be doubled. In practice this means that a new memory bank will be used in the RAM memory 70. Unit 110 is a D-latch which latches the output value of the comparator 90 and uses it to address the new memory bank, in the RAM memory 70.

The comparator 90 and the subtractor 100 are the units that will handle the extended length field 14 so that the position in the header will be moved when the extension code is detected. Three extra bits will be added to the length field 11 and it is these extra bits that will be used to indicate the cell length. Accordingly the fixed size length field 11 is replaced with the extended length field 14 which is inserted into the data stream.

Compared with the operation of the circuit in FIG. 15 or 17 where a field is written into the memory, in FIG. 18 another field is written into the memory 70.

Figure 19:
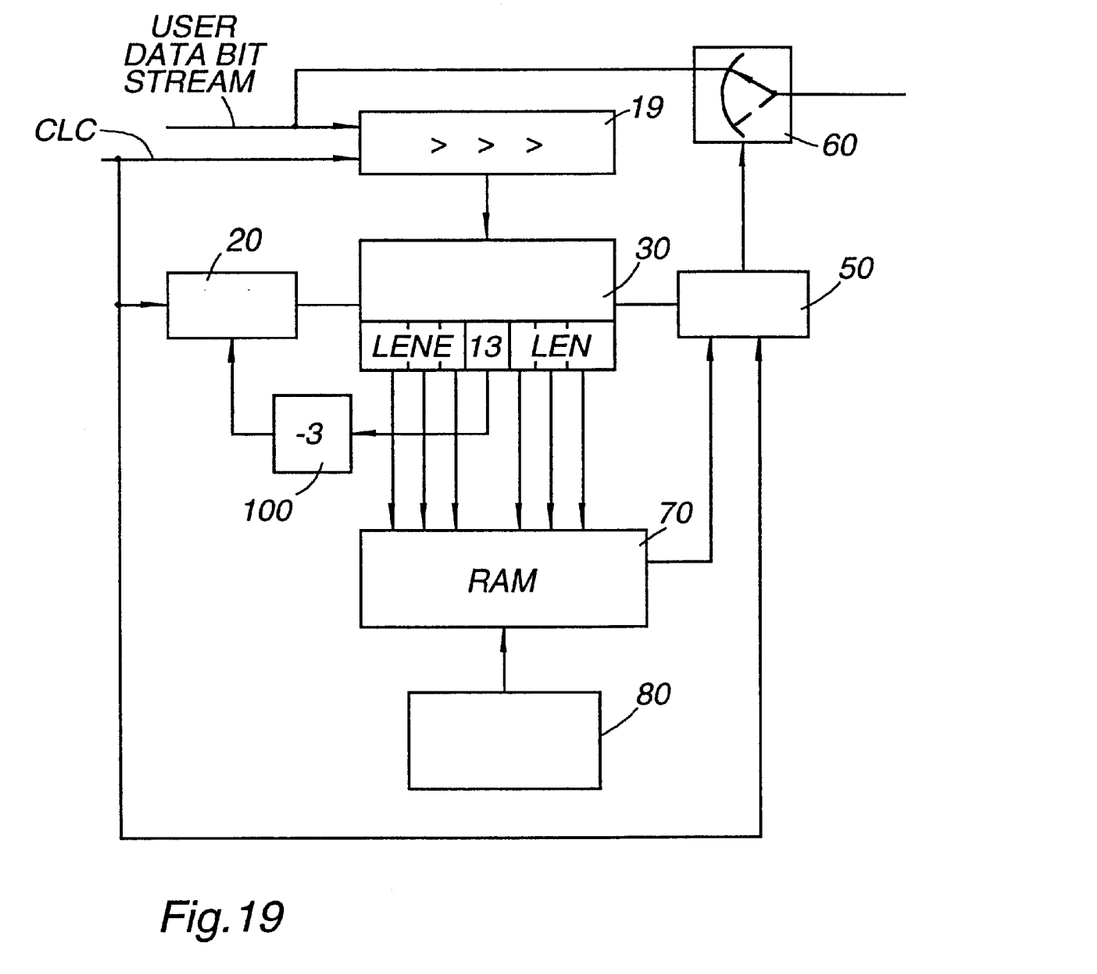
FIG. 19 is a block diagram showing a mini cell header analyzing unit used to extract the user data part of a mini cell from a user data channel using the bit extension method in accordance with the invention.

The cell header reading device shown in FIG. 18 can also be used in order to implement the extension bit method. This is indicated in FIG. 19. From the register 30 that contains the fixed size length field 11 the extension bit 13 is extracted and is used to increase the address range. The extension bit will count down the first counter 20 with three bits, indicated by the subtractor 100. This implies that three new bits will be written into register 30 and these new three bits plus the old three bits, i.e. altogether six bits, are used to address the RAM memory 70 as symbolized by the six arrows. In this manner the number of cell sizes has been increased.

The ROM memory 40 may have several different mapping tables of the kind shown in FIG. 5. It is possible to change from one mapping table to another in response to a predefined length code provided in the header of a mini cell. In this mammer it will be possible to switch from a first set of mini cell lengths, for example 4, 8, 16, 20 to a second set of lengths, for example 3, 6, 9, 12. Instead of using a ROM memory 40 configured with the mapping table shown in FIG. 5 a RAM memory can be used for the same purpose. This will enable the control system 80 to write in new a new set of mini cell lengths in the RAM memory. The whole table can also ne transferred in a control message.

Instead of providing each cell with a fixed size length field which is used to indicate the mini cell size it is possible to use an implicit method of indicating the mini cell size which does not use any length field in the mini cell header. According to the implicit method of indicating mini cell sizes, information relating to the sizes is resident within the system network. Instead of using a dedicated field to indicate the cell size an existing field in the mini cell header is used. In the preferred embodiment of the invention mini cell sizes are mapped on the identities of established connections. Accordingly sizes are not global but connection oriented.

Figure 20:
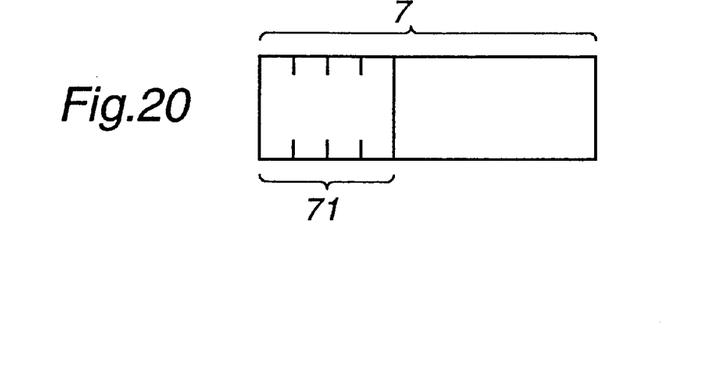
FIG. 20 shows a mini cell's header wherein the circuit identifier CID is used to indirectly indicate the mini cell size.
Figure 21:
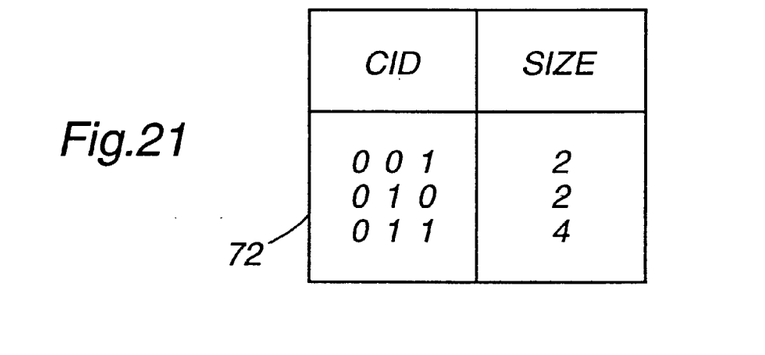
FIG. 21 is a mapping table used together with the indirect method for indicating the cell size.

The identity of a connection is given by the CID field of a connection. In FIG. 20 the mini cell header 7 is shown to comprise a CID field 71. The actual size of the CID field 71 depends on the system but generally two octets should be sufficient. By using the same mapping method as described in connection with FIGS. 6 and 7 a mapping table 72 results.

Accordingly the fixed length field 11 has been discarded. This will increase the band width efficiency. The CID value is used as address to the RAM memory 70 in FIG. 17 and is provided by the control system 80. So, instead of latching the length field 11 in the register 30, the CID value is latched in register 30 and is used as address to the RAM memory 70. In this manner there will be a relation between the identity of the established connection and the length of the mini cells used in the connection. Accordingly no additional memory places are needed for storing the relation between a CID and a size of the mini cell associated with said CID.

At set up of a connection the control system 80 will receive a message which requests (a) that a connection should be set up between to identified end points and (b) that this connection shall use mini cells having a size of X octets. X is supposed to be an integer selected among the available cell sizes. Next the control circuit selects a free CID among logical addresses provided by the ATM network. For the sake of the example CID=7 is selected. The control system 80 will now use 7 as an address to the RAM memory 70 and will write at this address the mini cell size X. The cell header reading device shown in FIG. 17 will then operate in the same manner as described. It should be noted that the mapping takes place at connection set-up.

Figure 22:
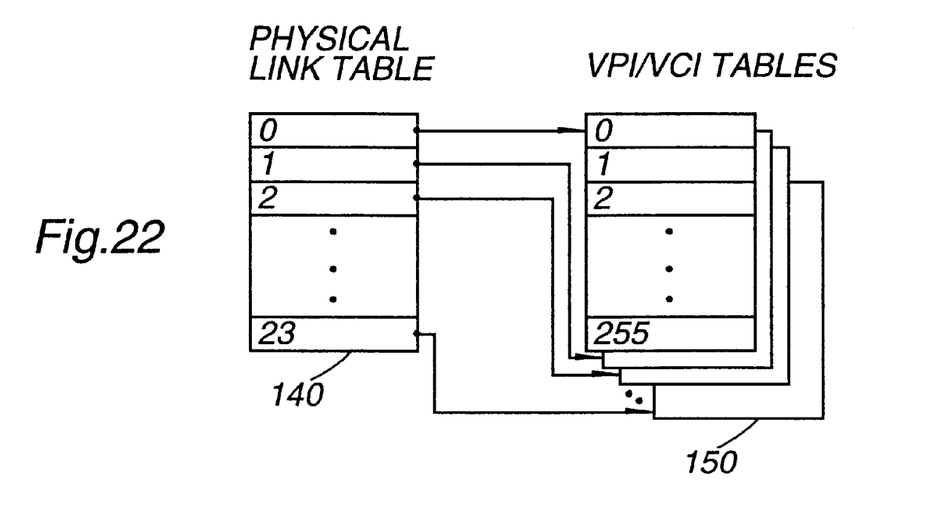
FIG. 22 shows different tables which together span up an address space used on the links of the transport network in a mobile telephone system.

It should be noted that one and the same CID may relate to several different mini cell sizes depending on the fact that cells having the same CID can be transported on different virtual connections VC:s. This is illustrated in FIG. 22 wherein a typical address structure used in an ATM network is shown. To each physical link, referred to as physical route, in the ATM network, there is a physical link table 140 having a number of entries, for example the indicated entries 0–23. To each physical link is associated a respective VPI/VCI (virtual path/virtual identifier) table 150. As an example there are 256 virtual paths VP 0–255 in each physical link. In each VC connection, identified with an VCI-/VPI value, there is as an example 256 mini cell connections each having its individual CID.

Figure 23:
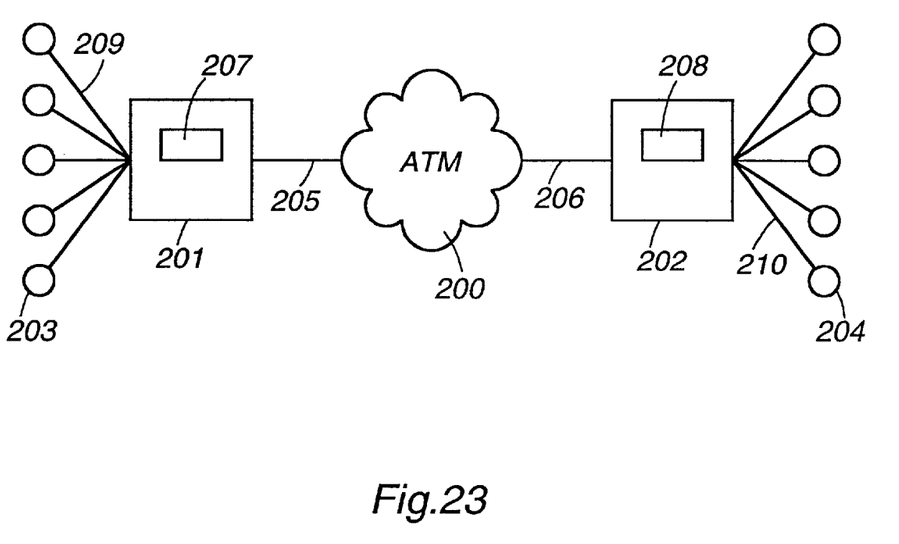
FIG. 23 is a block diagram of mobile telephone system provided with the cell header analyzing units.

In FIG. 23 there is shown a mobile telephone system comprising an ATM network 200 with a sending unit 201 and a receiving unit 202 are connected via respective link 205 and 206. User data sources 203 are connected to the sending unit over a respective connection as shown symbolically by the lines 209. User data sinks 204 are connected to the receiving unit 202 over a respective connection 210. Connections 209, formed by mini cells, are multiplexed together in the sending unit 201 with a non shown multiplexor. Likewise there is a non-shown demultiplexor in the receiving unit 202 that demultiplexes mini cells belonging to connections which are terminated by the user data sinks 204. In the sending unit 201 there is a mini cell header reading device 207 of the kind shown in any of FIGS. 15, 17, 18 or 19 and in the receiving unit there is a similar mini cell header reading device 208 of the kind shown in any of FIGS. 15, 17, 18 or 19.

What is claimed is:

1. A method for indicating the length of a mini cell in a communications system, the method comprising the steps of:

forming an ATM cell including a header portion and a payload portion, wherein said payload portion includes at least a portion of the mini cell; and providing a fixed size mini cell length indicator in a header portion of the mini cell, wherein said fixed size mini cell length indicator is non-linearly coded.

2. A method in accordance with claim 1, wherein said fixed size mini cell length indicator comprises an extension bit, wherein said extension bit, if set, indicates that a second fixed size mini cell length indicator follows said fixed size mini cell length indicator in said header.

3. A method in accordance with claim 1, wherein said fixed size mini cell length indicator comprises a predefined code which, if present, indicates that a second fixed size mini cell length indicator follows said fixed size mini cell length indicator in said header.

4. A method for indicating the length of a mini cell in a communications system, the method comprising the steps of:

forming an ATM cell including a header portion and a payload portion, wherein said payload portion includes at least a portion of said mini cell; and indicating the mini cell length using a connection identity CID of a connection, wherein said connection identity CID is in a header portion of the mini cell and wherein the connection includes mini cells the size of which are defined by the connection identity CID.

5. A method in accordance with claim 4, wherein said mini cell length is mapped on said connection identity CID during connection set up.

6. A method in accordance with claim 5, wherein a number of different mini cell lengths are mapped on a number of predefined connection identities during system initialization.

7. A method in accordance with claim 6, wherein the mini cell length is indicated by a group identifier (VP or VC) common to a number of different connections extending along a common path.

8. A method of indicating the length of a mini cell in accordance with claim 1, further comprising the step of:

mapping mini cell length indicators on mini cell lengths at memory locations of a memory in a mini cell header reading device, wherein the mini cell length indicator is used as an address to said mini cell length.

9. A method of indicating the length of a mini cell in accordance with claim 6, further comprising the steps of:

mapping connection identities CIDs on mini cell lengths at memory locations of a memory in a mini cell header reading device; and using said connection identity CID as an address to said mini cell length.

10. A method of indicating the length of a mini cell which comprises a header and a payload, said header comprising a length field which comprises a first number of bits and a length extension qualifier field which comprises a second number of bits, the method comprising the step of:

indicating the length of the mini cell using said first number of bits; and extending the length field using said second number of bits as a length extension code, wherein if said length field is extended the header of said mini cell and the payload of the mini cell are also extended.

11. A method in accordance with claim 10 further comprising the step of:

defining a first set of code values using said bits of said length extension qualifier field, which when present in said length extension qualifier field are appended to said first number of bits in the length field so as to indicate the length of the payload of said mini cell using a linear coding scheme.

12. A method in accordance with claim 11, wherein for each code value of said first set there are associated $2^N$ different values, where N equals said first number of bits.

13. A method in accordance with claim 12, further comprising the step of:
defining a second code value using said bits of said length extension qualifier field, wherein said second code value is different from said first set of code values, wherein said second code value when present in the length extension qualifier field indicates that the header of the mini cell is extended with extended header, comprising a second length field and that said length field is replaced with an extension qualifier field, which is used to extend said second length field of said mini cell.

14. A method in accordance with claim 13, wherein said extension qualifier field comprises said first number of bits and that said second length field comprises a third number of bits.

15. A method in accordance with claim 14, wherein a sub set of bits of said extension qualifier field are used as an extension code appended to said third number of bits of said second length field.

16. A method in accordance with claim 15, wherein for each extension code there is associated $2^M$ different length values, where M is the number of bits of said second length field.

17. A method in accordance with claim 16, wherein said extension qualifier field comprises a cell type code which when present in the header of the mini cell indicates that the mini cell is an operation and maintenance mini cell comprising a header and a payload, wherein said payload of said operation and maintenance mini cell comprises operation and maintenance information.

18. An apparatus for indicating the length of a mini cell in a communications system, the apparatus comprising:
means for forming an ATM cell including a header portion and a payload portion, wherein said payload portion includes at least a portion of the mini cell; and
means for providing a fixed size mini cell length indicator in a header portion of the mini cell, wherein said fixed size mini cell length indicator is non-linearly coded.

19. An apparatus in accordance with claim 18, wherein said fixed size mini cell length indicator comprises an extension bit, wherein said extension bit, if set, indicates that a second fixed size mini cell length indicator follows said fixed size mini cell length indicator in said header.

20. An apparatus in accordance with claim 18, wherein said fixed size mini cell length indicator comprises a predefined code which, if present, indicates that a second fixed size mini cell length indicator follows said fixed size mini cell length indicator in said header.

21. An apparatus for indicating the length of a mini cell in a communications system, the apparatus comprising:
means for forming an ATM cell including a header portion and a payload portion, wherein said payload portion includes at least a portion of said mini cell; and
means for indicating the mini cell length using a connection identity CID of a connection, wherein said connection identity CID is in a header portion of the mini cell and wherein the connection includes mini cells the size of which are defined by the connection identity CID.

22. An apparatus in accordance with claim 21, wherein said mini cell length is mapped on said connection identity CID during connection set up.

23. An apparatus in accordance with claim, 22, wherein a number of different mini cell lengths are mapped on a number of predefined connection identities during system initialization.

24. An apparatus in accordance with claim 23, wherein the mini cell length is indicated by a group identifier (VP or VC) common to a number of different connections extending along a common path.

25. An apparatus for indicating the length of a mini cell in accordance with claim 18, further comprising:
means for mapping cell length indicators on mini cell lengths at memory locations of a memory in a mini cell header reading device, wherein the cell length indicator is used as an address to said mini cell length.

26. An apparatus for indicating the length of a mini cell in accordance with claim 23, further comprising:
means for mapping connection identities CIDs on mini cell lengths at memory locations of a memory in a mini cell header reading device; and
means for using said connection identity CID as an address to said mini cell length.

27. An apparatus for indicating the length of a mini cell which comprises a header and a payload, said header comprising a length field which comprises a first number of bits and a length extension qualifier field which comprises a second number of bits, the apparatus comprising:
means for indicating the length of the mini cell using said first number of bits; and
means for extending the length field using said second number of bits as a length extension code, wherein if said length field is extended the header of said mini cell and the payload of the mini cell are also extended.

28. An apparatus in accordance with claim 27 further comprising:
means for defining a first set of code values using said bits of said length extension qualifier field, which when present in said length extension qualifier field are appended to said first number of bits in the length field so as to indicate the length of the payload of said mini cell using a linear coding scheme.

29. An apparatus in accordance with claim 27, wherein for each code value of said first set there are associated $2^N$ different values, where N equals said first number of bits.

30. An apparatus in accordance with claim 29, further comprising:
means for defining a second code value using said bits of said length extension qualifier field, wherein said second code value is different from said first set of code values, wherein said second code value when present in the length extension qualifier field indicates that the header of the mini cell is extended with an extended header, comprising a second length field and that said length field is replaced with an extension qualifier field, which is used to extend said second length field of said mini cell.

31. An apparatus in accordance with claim 30, wherein said extension qualifier field comprises said first number of bits and that said second length field comprises a third number of bits.

32. An apparatus in accordance with claim 31, wherein a sub set of bits of said extension qualifier field are used as an extension code appended to said third number of bits of said second length field.

33. An apparatus in accordance with claim 32, wherein for each extension code there is associated $2^M$ different length values, where M is the number of bits of said second length field.

34. An apparatus in accordance with claim 33, wherein said extension qualifier field comprises a cell type code which when present in the header of the mini cell indicates that the mini cell is an operation and maintenance mini cell comprising a header and a payload, wherein said payload of said operation and maintenance mini cell comprises operation and maintenance information.

* * * * *